United States Patent [19]

Okuno et al.

[11] 4,111,159

[45] Sep. 5, 1978

[54] RECOVERY OF HEAT FROM MOLTEN SLAG FROM METALLURGICAL PROCESSES

[75] Inventors: Ryuzo Okuno, Kobe; Hiroo Fujii, Kakogawa; Keio Toyoda, Osaka, all of Japan

[73] Assignee: Kawasaki Jukogyo Kabushiki Kaisha, Kobe, Japan

[21] Appl. No.: 779,600

[22] Filed: Mar. 21, 1977

[30] Foreign Application Priority Data

Mar. 24, 1976 [JP] Japan .................. 51-32980

[51] Int. Cl.² .............................................. F22B 1/02
[52] U.S. Cl. ........................................ 122/27; 266/227
[58] Field of Search ............... 110/8 E, 28 P; 122/27, 122/6 R; 266/201, 227, 228; 432/85

[56] References Cited

U.S. PATENT DOCUMENTS

| 379,412 | 3/1888 | Peck | 122/27 |
|---|---|---|---|
| 746,240 | 12/1903 | Baggaley | 122/27 |
| 760,172 | 5/1904 | Baggaley et al. | 122/27 |
| 1,166,745 | 1/1916 | Daily | 122/27 |

Primary Examiner—Charles J. Myhre
Assistant Examiner—Margaret A. LaTulip
Attorney, Agent, or Firm—Haseltine, Lake, & Waters

[57] ABSTRACT

Molten slag in a vessel or vessels is placed below heat absorbing tubes through which water is passed and converted into steam by the heat radiated by the slag of high temperature, the heat thus being recovered by utilizing the steam for heating purposes, or for driving a turbine or the like. A cover is placed over the tubes and the vessel or vessels to increase the heat transfer efficiency. Any cooled slag layer formed on the surface of the molten slag in the vessel is removed by skimming to promote the heat transfer and, after the temperature of the slag in the vessel has lowered to about 1,200° C, the slag is agitated to further promote the heat transfer. Alternatively, the slag in the vessel or vessels is agitated from the beginning until its temperature has lowered to about 700° C.

9 Claims, 5 Drawing Figures

RECOVERY OF HEAT FROM MOLTEN SLAG FROM METALLURGICAL PROCESSES

BACKGROUND OF THE INVENTION

This invention relates to a method of recovering heat from slag, from ore refining processes and to apparatus for practicing the method.

It is well known that the slag produced in an ore refining or smelting process as, for example, in a blast furnace, is of a great quantity and is at a high temperature, and the heat energy carried away by this slag is of tremendous quantity. However, this slag is ordinarily allowed to flow onto a melt dumping yard to cool naturally or by sprinkling with water, and, according to the present practice, there is no recovering whatsoever of this tremendous heat energy, which is therefore wasted.

As one example, the case of slag in a blast furnace will be considered quantitatively. It is said that the quantity of slag produced in a blast furnace is ordinarily of the order of 0.28 to 0.35 parts per one part of pig iron. From a blast furnace of 10,000-metric ton daily production, the slag output is approximately 3,000 metric tons per day. On the assumption that the slag temperature is 1,500° C., and that the specific heat of the slag is 0.24 Kcal./kg.° C., that heat loss is approximately $1.08 \times 10^9$ Kcal. per day, or $45.0 \times 10^6$ Kcal. per hour. Converted into terms of fuel oil, this rate is 4,500 kg./hour, which is a considerable quantity.

SUMMARY OF THE INVENTION

It is an object of this invention to provide a method and apparatus for efficiently recovering heat from slag from a metallurgical process by effectively collecting the sensible heat of the slag as heat contained within steam or some other high-temperature fluid or gas through radiant heat absorbing tubes for heat absorption and recovery.

According to this invention in one aspect thereof, briefly summarized, there is provided a method of recovering heat from slag from a metallurgical process, characterized in that the slag is placed below radiant heat tubes as a fluid medium is passed through these tubes thereby to cause heat radiated by the slag to be transferred to the fluid medium and thereby to be recovered, and part of the slag of higher temperature is exposed on the slag surface thereby to promote the heat transfer.

According to this invention in another aspect thereof, there is provided an apparatus for practicing the above stated method, comprising: at least one vessel with open top for containing the slag; a cover structure for covering the top of the vessel with a space formed therebetween; radiant heat tubes disposed in the space and communicating with piping outside the cover structure, a fluid medium being passed through these tubes thereby to absorb heat radiated by the slag and to transfer the heat to the piping for utilization; and means for exposing part of the slag of higher temperature on the surface of the slag.

The nature, utility, and further features of this invention will be apparent from the following detailed description with respect to preferred embodiments of the invention when read in conjunction with the accompanying drawings, which are briefly described below, and in which like parts are designated by like reference numerals and characters.

DESCRIPTION OF THE PREFERRED EMBODIMENTS

Figure 1:
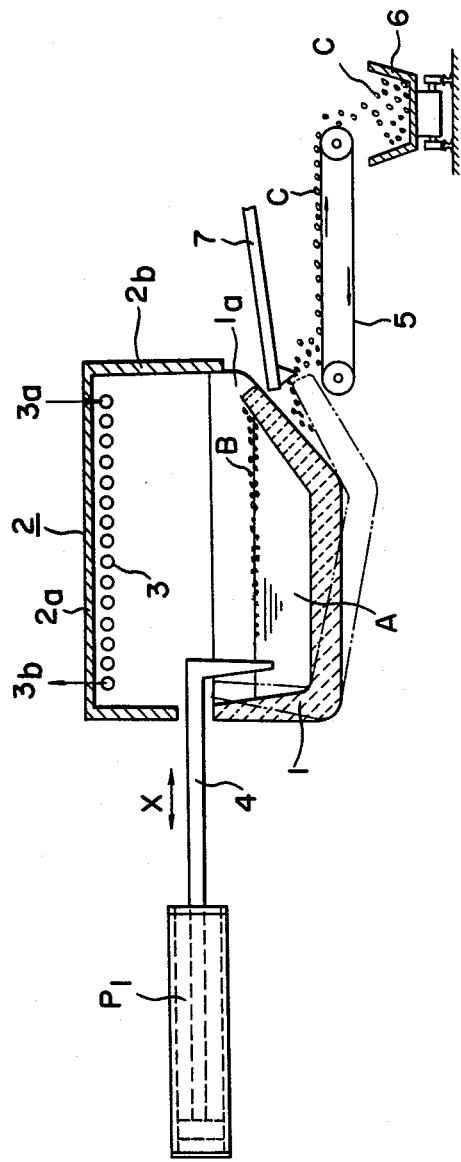
FIG. 1 is a diagrammatic side elevation, with parts shown in vertical section, showing the general construction and arrangement of the essential parts of one example of an apparatus for the method of this invention.

Referring first to FIG. 1, the principal part of the apparatus shown therein is a tiltable slag tank 1 containing a body of molten slag A and having a pouring inlet (not shown) and a discharging outlet 1a for the slag. Above the slag vessel 1 is disposed a cover structure 2 having side walls 2b and a ceiling 2a and covering the entire open top of the slag vessel 1. Within the cover structure 2 and near the ceiling 2a thereof, there are supported radiant heat tubes 3 for absorbing and conducting away radiant heat. These tubes 3 are adapted to convert water into steam, for example.

A side wall 2b of the cover structure 2 is provided with an opening for insertion therethrough of a skimming and agitating device 4 driven in the X directions by a motive power source P1 such as a hydraulic or pneumatic cylinder. A conveyer 5 is provided at the discharge end of the slag vessel 1 for conveying solidified slag from the slag vessel 1 to trucks 6.

The sensible heat radiated by molten slag poured into the slag vessel at a temperature between about 1,400° and 1,500° C. is absorbed by the radiant heat tubes 3, and the water flowing through the radiant heat tubes 3 from an inlet 3a to an outlet 3b is thus converted into steam, which is conducted out of the cover structure 2 to means (not shown) such as a steam turbine for utilizing the heat in the steam. As a result of this heat exchange, a layer, ordinarily a solidified layer B, cooled to a temperature between about 700° and 800° C. by lowering of the slag surface temperature is formed at the surface of the molten slag A. The skimming and agitating device 4 is operated periodically and moved in the arrow direction to skim off this cooled layer B and to move it out of the vessel. The skimming operation by the device 4 is effective to expose the slag A of high temperature existing below the slag level or below the solidified layer B and to cause as high quantity of radiant heat as possible to be transmitted to the radiant heat tubes 3. The body of the molten slag A in the vessel 1 gradually cools down to about 1,200° C. while radiating heat, and begins to be solidified at that temperature. At this stage, the skimming and agitating device 4 is operated to stir and agitate the slag for the purpose of exposing above the slag level solidified slag, which is still at relatively high temperature and has sufficient heat to be utilized. For this agitating operation, the device 4 may be moved fast and the power source P1 may be so inclined by means not shown as to cause its free end to move deeply into the vessel 1. The agitating operation by the device 4 is continued until the solidified slag cools down to about 700° C. At this final stage, the solidified slag is in a granular state because of the agitating action of the device 4. The slag after recovery of heat is discharged out of the slag vessel 1 by tilting it as shown by phantom line. It will be noted that when the slag is to be discharged from the vessel 1, it has cooled from its initial temperature of from about 1,400° to 1,500° C. down to about 700° C. In order to discharge the granulated cooled slag from the tilted vessel 1, a rake 7 may be used. The granulated slag in the vessel 1 is raked onto the conveyer 5, which conveys the granulated slag, indicated by reference character C, and dumps it into the trucks 6 to be transported to a specific dumping place or to a residual heat recovery plant. It will be understood that the granulation of the slag facilitates subsequent handling of the utilized slag.

Figure 2:
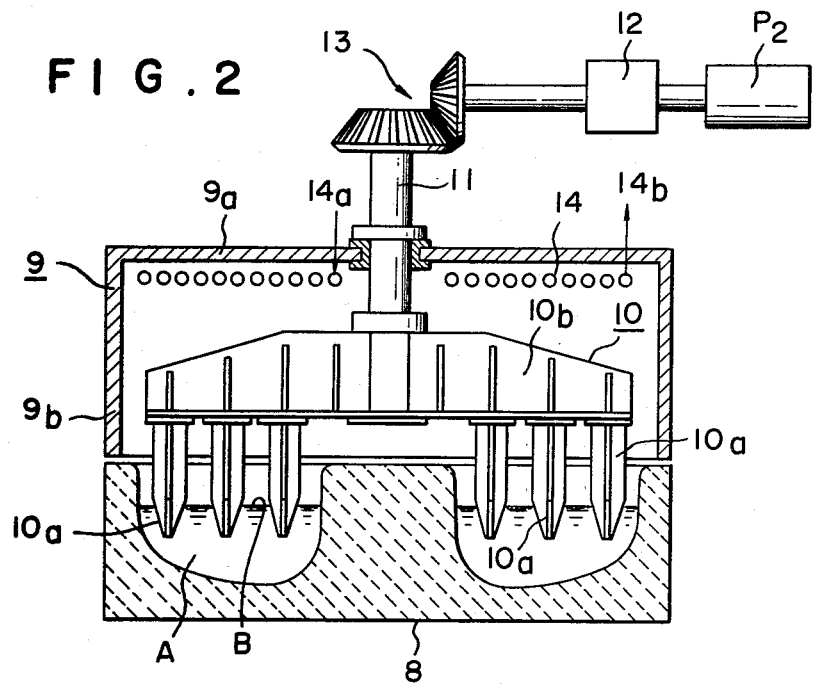
FIG. 2 is a similar diagrammatic elevation, showing another example of an apparatus according to the invention.

In a second embodiment of the invention as illustrated in FIG. 2, slag vessel 8 of annular shape in plan view is used and is covered over its open top part by a cover structure 9 having a cylindrical side wall 9b and a circular ceiling 9a. The slag vessel 8 contains an annular body of molten slag A. Above the slag vessel 8, there is provided a rotary agitator 10 with stirring vanes 10a having the section of a cross and extending downward into the molten slag A from a diametrically extending beam 10b. The beam 10b of the agitator 10 is fixed to a vertical rotating shaft 11 driven by a motive power source P2 through a reduction mechanism 12 and a gear mechanism 13. Radiant heat tubes 14, of spiral shape for example, having an inlet 14a and an outlet 14b are provided within the cover structure 9 near its ceiling 9a.

In the operation of this apparatus, the sensible heat radiated from the molten slag A is absorbed by the radiant heat tubes 14 similarly as in the preceding embodiment. During this operation, a slag layer B is formed by cooling at the surface of the molten slag A but is continuously stirred or broken up by the vanes 10a of the rotating agitator 10, whereby heat radiation from the slag A is improved. In this embodiment of the invention, the molten slag A and the cooled slag layer B are mixed by the agitation without skimming operation, and the agitating operation is continued until the slag in the vessel 8 cools down to about 700° C. and is transformed into granules of slag as mentioned hereinbefore in connection with the first embodiment.

Figure 3:
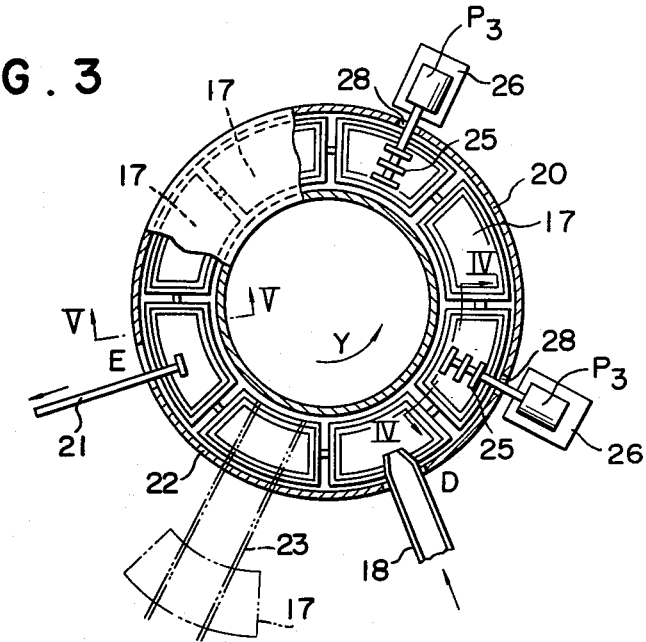
FIG. 3 is a plan view, with parts cut away, showing a third example of an apparatus according to the invention.
Figure 4:
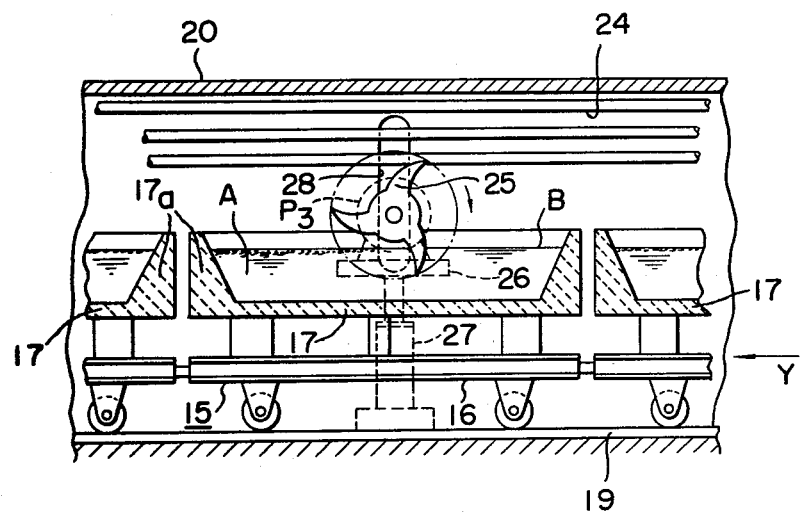
FIG. 4 is a fragmentary elevation in section, on an enlarged scale, taken along the curved surface indicated by line IV—IV in FIG. 3 as viewed in the arrow direction.
Figure 5:
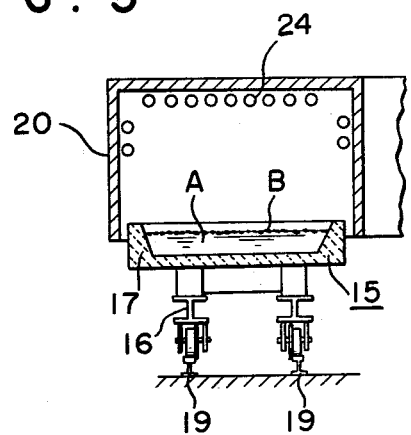
FIG. 5 is a cross sectional view, on an enlarged scale, taken along the plane indicated by line V—V in FIG. 3 as viewed in the arrow direction.

In a further embodiment of this invention as shown in FIGS. 3, 4 and 5, there is provided a rotary furnace assembly 15 comprising a plurality of bogies or trucks 16 respectively carrying slag vessels 17 thereon and coupled in an endless annular arrangement. The trucks 16 run on rails 19 laid out in a circle. The rotary furnace assembly 15 is covered by an annular cover structure 20. The molten slag A at a temperature between about 1,400° and 1,500° C. is poured into each slag tank 17 at the position D by means of a trough 18 and is conveyed in the arrow direction Y in FIG. 3 to the position E, where the cooled slag in a granulated state is discharged from each slag vessel 17 by means of a rake 21, for example. If desired, the cover structure 20 may have in the lower edge thereof a cutout 22 through which each truck 16 with its vessel 17 thereon is moved out of the structure 20 along rails 23 as indicated by phantom lines, after the discharge of the cooled granular slag, for the purpose of renewing the vessel 17.

During the rotary conveying operation, the sensible heat radiated from the molten slag A and the solidified slag still at high temperature is absorbed and conducted out by radiant heat tubes 24 installed within the cover structure 20 similarly as in the preceding first and second embodiments of the invention. The layer B of cooled slag formed on the surface of the molten slag A during this operation as well as the solidified slag subsequently formed in the vessels is stirred or broken up successively by a plurality of groups of agitator vanes 25 provided within the cover structure 20 at positions between the stations D and E and driven by respective motive power sources P3. It will be understood that the agitating operation is carried out continuously as the slag cools from its initial temperature to about 700° C. without the skimming operation.

Means are provided to raise each group of agitator vanes 25 so that they will not be in the way of the upper end rims 17a of the slag vessels 17 when they pass by under these vanes 25. One example of means for this purpose comprises a mounting structure 26 supporting the motive power source P3 of each agitator vane group such as a motor and adapted to be movable in the up-and-down direction by means of a hydraulic or pneumatic cylinder 27, and the driving shaft by which group of vanes 25 driven by the power source P3 is passed through a vertically orientated slot 28 formed in the side wall of the cover structure 20. In order to fully utilize the heat in the slag, the agitator vanes 25 are lowered from the position shown in FIG. 4 to a lower position in which the vanes can agitate the deepest part of the molten slag and the solidified slag in the vessel 17.

In the above described embodiments of the invention, the cooled layer B formed on the surface of the molten slag A is peeled off by skimming off and/or the solidified slag of high temperature as well as the cooled layer B is agitated by stirring or breaking up. These actions are effective in recovering heat from the slag as described hereinafter. Particularly in the case of the second and third embodiments of the invention, in which agitators 10 and 25 are used, the part of the molten slag A as well as the subsequently solidified slag C below the cooled layer B, that is, the slag at high temperature, is also stirred. This prevents cooling of only the upper layers, whereby the heat recovery is accomplished even more effectively.

While, in the above described examples of the invention, water passed through radiant heat tubes 3, 14, and 24 is converted into steam, it is also possible to conduct a fluid other than water through the tubes and to convert it into a high-temperature fluid or a vapor thereby to recover the heat.

In the practice of this invention, radiant heat tubes for recovery of the sensible heat of the slag, for example, for water-steam conversion, are used as above described. In general, the heat recovered through absorption of radiant heat increases with the difference between the surface temperature of the radiant heat source and the surface of the heat absorbing surface. On one hand, the thermal conductivity of molten slag and solidified slag is very low, and if the molten slag as well as solidified slag is merely left standing, the heat in the entire slag body cannot be fully utilized since the heat in the inner parts of the slag is not readily conducted to the cooled surface layer.

In accordance with this invention, however, the cooled surface layer is skimmed off or the molten slag and the solidified slag are agitated, whereby the slag surface is constantly maintained at a high temperature thereby to promote the transfer of heat therefrom to the radiant heat tubes.

While only a few examples of the apparatus according to this invention have been described and illustrated in the drawings, it will be apparent that various other modifications of these examples are possible. For example the trucks carrying respective slag vessels can be run on straight or curved rails of finite length through a tunnel-like cover structure and returned after emptying to a loading station on return rails.

We claim:

1. A method of recovering heat from slag from a metallurgical process, comprising the steps of placing a molten slag below radiant heat absorbing tubes, passing a fluid medium through the heat absorbing tubes, causing heat radiated by the molten slag and by subsequently solidified slag at high temperature to undergo transfer to the fluid medium and thereby to be recovered, and exposing the molten and solidified slags on the slag surface thereby to promote said transfer of heat.

2. A method of recovering heat as claimed in claim 1 wherein the molten slag is exposed by peeling any cooled slag layer on the slag surface by skimming and the solidified slag at high temperature is exposed by agitation.

3. A method of recovering heat as claimed in claim 1 wherein the molten slag and the solidified slag at high temperature are exposed by agitation.

4. Apparatus for recovering heat from slag from a metallurgical process, comprising: a vessel with an open top for containing the slag; a cover structure for covering the top of the vessel with a space formed between the cover structure and the surface of the slag; radiant heat absorbing means disposed in said space and communicating with piping outside the cover structure, a fluid medium being passed through the radiant heat absorbing means thereby to absorb heat radiated by the slag and transfer the heat to the heat absorbing means for utilization; and means for exposing part of the slag of relatively higher temperature on the surface of the slag.

5. Apparatus for recovering heat as claimed in claim 4 wherein said means for exposing part of the slag comprises a skimming device for skimming any cooled slag layer off the surface of the slag in molten state.

6. Apparatus for recovering heat as claimed in claim 4 wherein said means for exposing part of the slag comprises means for agitating the slag.

7. Apparatus for recovering heat as claimed in claim 4 wherein said vessel has an annular shape in plan view, the cover structure thereby cylindrical, and said means for exposing part of the slag comprises a rotating agitator fixed to a central vertical shaft and having a plurality of stirring vanes projecting into the slag, and a motive power source for driving said shaft.

8. Apparatus for recovering heat from slag from a metallurgical process, comprising: a plurality of vessels with open tops adapted to contain portions of the slag and disposed end-to-end in a circle; a plurality of trucks coupled end-to-end in said circle and each supporting a respective one of the vessels; rail means laid out in said circle and supporting said trucks thereon; an annular cover structure for covering the tops of the vessels from above with a space formed therebetween; radiant heat absorbing means disposed in said space and communicating with piping outside the cover structure, a fluid medium being passed through the radiant heat absorbing means thereby to absorb heat radiated by the slag and transfer the heat to the heat absorbing means for utilization; and means for agitating the slag in each vessel thereby to remove any cooled slag layer from the upper surface of the slag and to stir the slag in molten state as well as in subsequently solidified condition at high temperature.

9. Apparatus for recovering heat as claimed in claim 8 wherein said means for agitating the slag comprises agitator vanes and means for vertically moving the agitator vanes into and out of the slag in each vessel.

* * * * *